(12) United States Patent
Nishino (10) Patent No.: US 8,769,167 B2
(45) Date of Patent: Jul. 1, 2014

(54) CHANNEL DEVICE, INFORMATION PROCESSING SYSTEM AND DATA TRANSFER METHOD

(75) Inventor: Shuji Nishino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 12/369,445

(22) Filed: Feb. 11, 2009

(65) Prior Publication Data

US 2009/0216919 A1  Aug. 27, 2009

(30) Foreign Application Priority Data

Feb. 27, 2008  (JP) ................. 2008-046110

(51) Int. Cl.
*G06F 13/00* (2006.01)
(52) U.S. Cl.
USPC ............................................................ 710/34
(58) Field of Classification Search
USPC ............................................................ 710/34
See application file for complete search history.

(56) References Cited

U.S. PATENT DOCUMENTS

| | | | |
|---|---|---|---|
| 4,346,439 A | | 8/1982 | Huno et al. |
| 5,708,849 A | | 1/1998 | Coke et al. |
| 5,802,546 A | | 9/1998 | Chisholm et al. |
| 5,809,527 A | * | 9/1998 | Cooper et al. ............. 711/133 |
| 5,860,022 A | * | 1/1999 | Kondou et al. ................ 710/1 |
| 6,018,746 A | * | 1/2000 | Hill et al. ..................... 707/679 |
| 6,560,677 B1 | * | 5/2003 | Bridges et al. ............... 711/129 |
| 2006/0212612 A1 | * | 9/2006 | Takamiya et al. .............. 710/24 |

FOREIGN PATENT DOCUMENTS

| | | |
|---|---|---|
| JP | 55-97630 | 7/1980 |
| JP | 59-177634 | 10/1984 |
| JP | 61-151765 | 7/1986 |
| JP | 01-281553 | 11/1989 |
| JP | 9-160862 | 6/1997 |
| JP | 10-177541 | 6/1998 |
| WO | 99/34273 | 7/1999 |
| WO | 2004/104846 A2 | 12/2004 |

OTHER PUBLICATIONS

European Search Report issued May 6, 2009 in corresponding European Patent Application 09153459.4.
Japanese Office Action issued Aug. 7, 2012 in corresponding Japanese Patent Application No. 2008-046110.

* cited by examiner

*Primary Examiner* — Henry Tsai
*Assistant Examiner* — Juanito Borromeo
(74) *Attorney, Agent, or Firm* — Staas & Halsey LLP (57) ABSTRACT

A channel device equipped with a data buffer unit storing data transferred between a storage device and an input-output device, a transfer controller transferring continuous data between the storage device and the data buffer unit using channel startup information. The storage device transfer controller transfers first data between the storage device and the data buffer unit using first transfer information stored in the address list and transfers the second data using second transfer information and total transfer amount information stored in the address list after the first data is transferred and an input-output device transfer controller transfers the continuous data between the data buffer unit and the input-output device.

6 Claims, 10 Drawing Sheets

CHANNEL DEVICE, INFORMATION PROCESSING SYSTEM AND DATA TRANSFER METHOD

CROSS-REFERENCE TO RELATED APPLICATIONS

This application claims the benefit of Application No. 2008-46110, filed in the Japanese Patent Office on Feb. 27, 2008, the entire contents of which are incorporated herein by reference.

BACKGROUND

1. Field

The present invention relates to a channel device and an information processing apparatus having the channel device and a method thereof.

2. Description of the Related Art

An improvement in transferring data distributed to multiple areas in a memory to an input-output (IO) device is needed. For example, there has been a system that is capable of transferring data stored on a hard disk to an arbitrary external device by direct memory Access (DMA).

Another data transfer method is a chain data processing. The chain data processing is a method for transferring data distributed to the multiple areas in the memory to the IO device in accordance with one command.

The channel device controls and executes the data transfer between the IO device by fetching a command for controlling the data transfer from the memory. The command includes a data address in the memory, a transfer byte count and a flag that are used by the channel device for the data transfer. Data addresses and byte counts of successive information are designated by setting a chain data flag from among flags included in command where the data to be read or written are distributed to the multiple areas in the memory in transferring data between the IO device and the memory. The process disclosed above is generally referred to as the chain data processing and the data transferred successively by the chain data processing is referred to as chain data.

Figure 9:
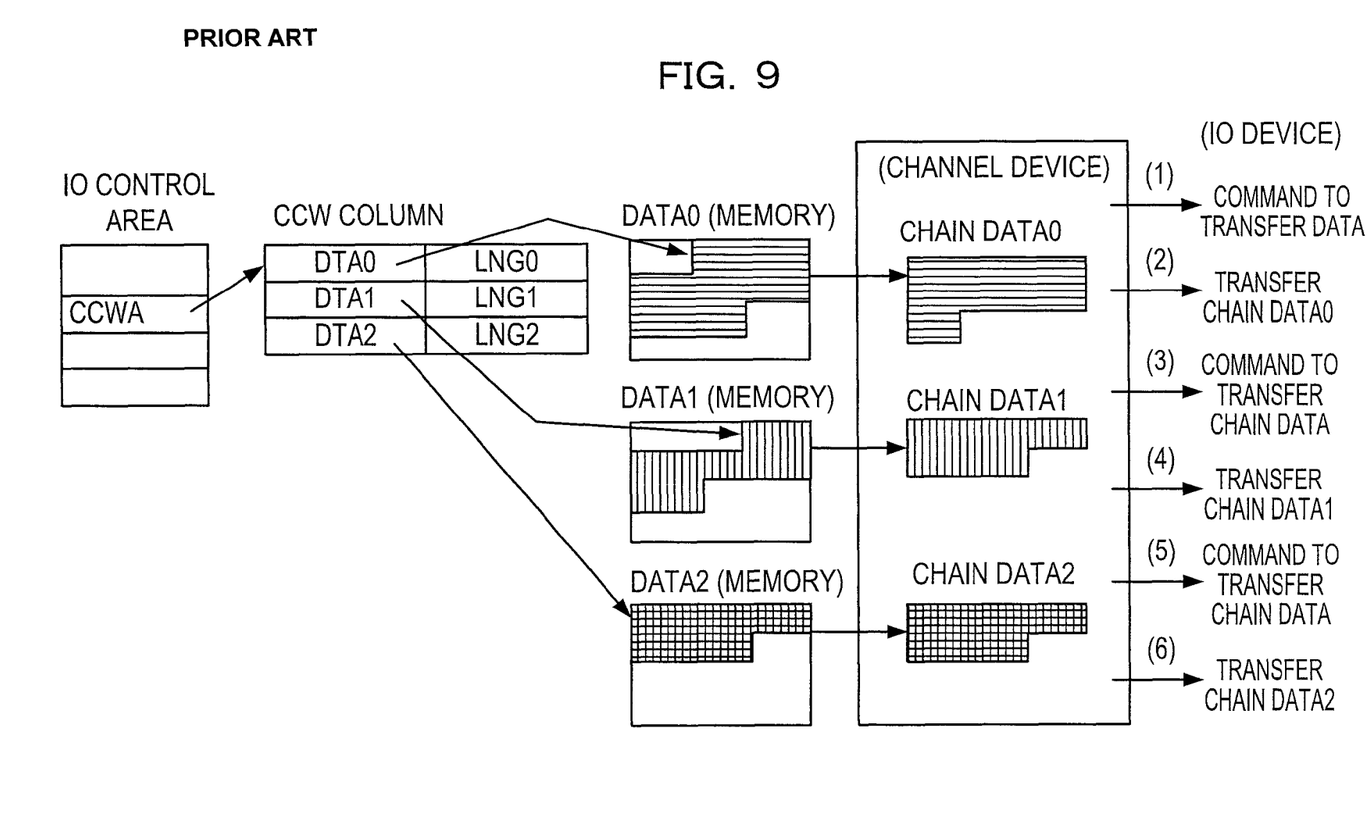
FIG. 9 illustrates a transfer method of a conventional channel device for transferring data by the chain data processing.

FIG. 9 illustrates a transfer method used of a conventional channel device for transferring data using the chain data processing.

FIG. 9 illustrates a case in which data stored in the memory is transferred to the IO device connected with the information processor through the channel device.

In FIG. 9, channel command word (CCW) columns are provided in the memory incorporated in the information processor before transferring the data by the chain data processing.

The CCW columns associates the first addresses (DTA 0, DTA 1 and DTA 2) of data distributed to the multiple data areas (data 0, data 1 and data 2) with transfer volumes of the data, i.e., transfer data lengths of each data, LNG 0, LNG 1 and LNG 2) and stores the first addresses and the data transfer amount.

An IO control area stores channel command word addresses (CCWAs) indicating addresses of the CCW columns in the memory. When an IO command is issued to transfer the data stored in the memory, the channel device reads the first address of the CCW column according to a designated CCWA. The channel device: (1) issues a command for transferring the data to a destination IO device to notify a direction of the data transfer and a amount of the data transfer; (2) reads first data 0 from the memory according to a data transfer start address, DTA 0 and a data transfer amount, LNG 0, stored in one of the CCW columns and then transfers the data to the IO device. After the data transfer according to the first CCW is completed, the next CCW is read.

Then the channel device: (3) issues a command for transferring the chain data to the IO device; (4) transfers the data read from the memory according to an address (DTA 1) and a transfer amount (LNG 1) stored in the next CCW column to the IO device.

As disclosed above, the channel device continues to issue the commands for transferring the chain data and transfers the chain data until all the chain data are transferred (5, 6).

FIG. 9 illustrates an operation of a write command, i.e., the data transfer from the memory to the IO device. An operation on a read commend, i.e., the data transfer from the IO device to the memory, is basically the same as the operation in FIG. 9 except the data is transferred in a reverse direction.

Figure 10:
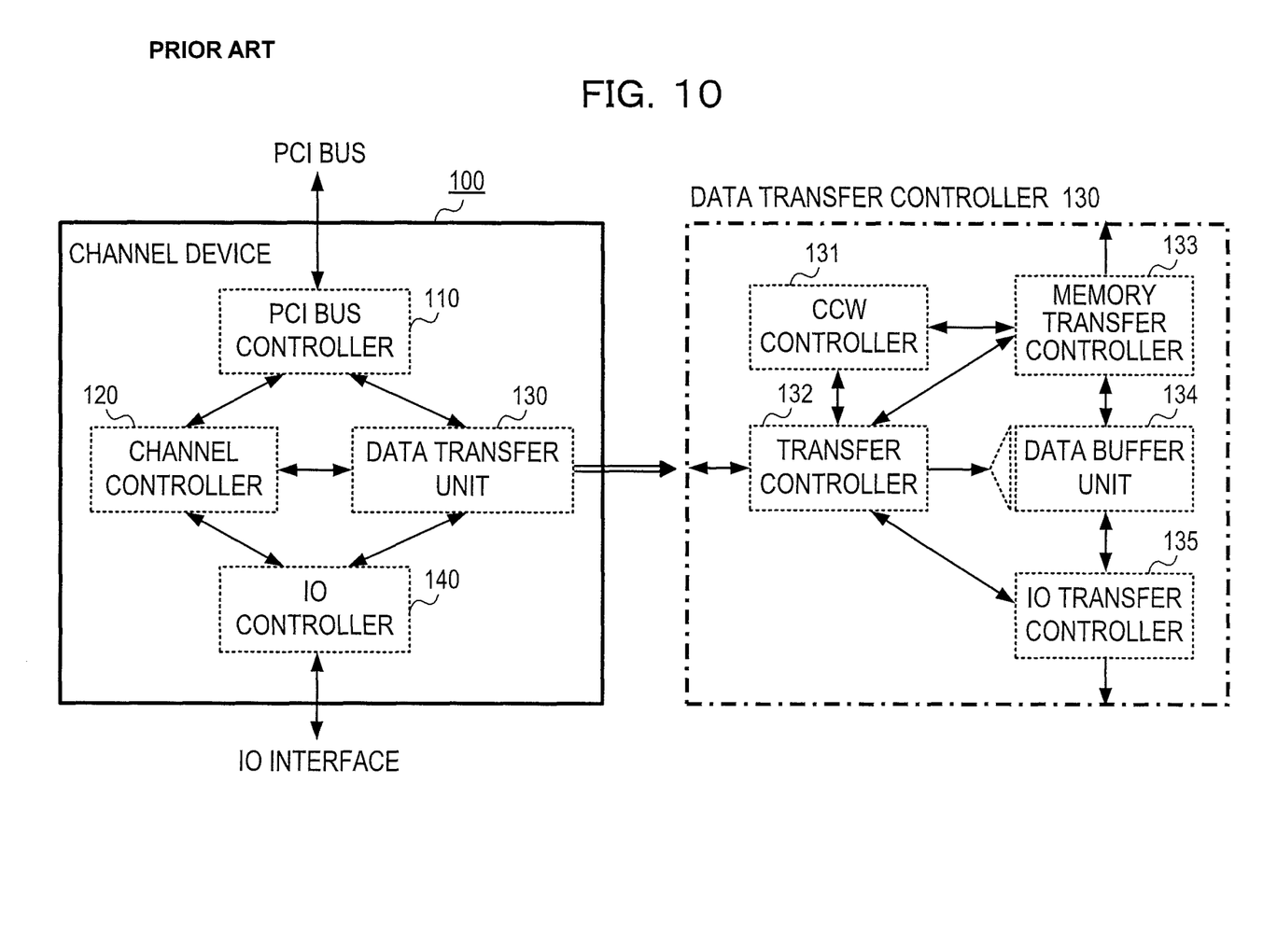
FIG. 10 illustrates a structure of the channel device implementing a conventional chain data processing.

FIG. 10 illustrates the structure of the channel device implementing the chain data disclosed above. The channel device 100 shown in FIG. 10 has a PCI bus controller 110, a channel controller 120, a data transfer controller 130 and an IO controller 140.

PCI bus controller 110 controls a connection with a PCI bus included in the information processing apparatus. Channel controller 120 controls the entire operation of the channel device 100. Data transfer controller 130 controls data exchange between the memory included in the information processing apparatus and the IO device. The IO controller 140 controls a connection with the IO interface included in the IO device.

The data transfer controller 130 has CCW controller 131, transfer controller 132, memory transfer controller 133, data buffer unit 134 and IO transfer controller 135.

CCW controller 131 controls the operations of the information processing apparatus relating to the CCW such as reading data from the CCW columns in processing the chain data. Transfer controller 132 controls the entire operation of the data transfer controller 130. Memory transfer controller 133 receives data stored in the memory through PCI bus controller 110 and writes the data in data buffer 134 or transfers the data stored in data buffer 134 to the memory through PCI bus controller 110.

Data buffer unit 134 compensates for a difference between rates of transmissions from the memory and from the IO device. IO transfer controller 135 transfers data stored in data buffer unit 134 to the IO device through the IO controller 140 or writes data sent from the IO device in data buffer unit 134.

SUMMARY

The object described above is achieved by the disclosed device and method. A disclosed channel device includes a data buffer unit storing data transferred between a storage device and an input-output device, a transfer controller starting to transfer continuous data between the storage device and the data buffer unit using channel startup information, a storage device transfer controller transferring first data between the storage device and the data buffer unit using first transfer information stored in the address list. The second data is transferred between the storage device and the data buffer unit using the second transfer information and a total transfer amount information stored in the address list stored in the storage device after the first data is transferred and an input-output device transfer controller transferring the continuous data between the data buffer unit and the input-output device.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to the embodiments, examples of which are illustrated in the accompanying drawings, wherein like reference numerals refer to the like elements throughout. The embodiments of the present invention are described below with reference to the accompanying drawings.

Figure 1:
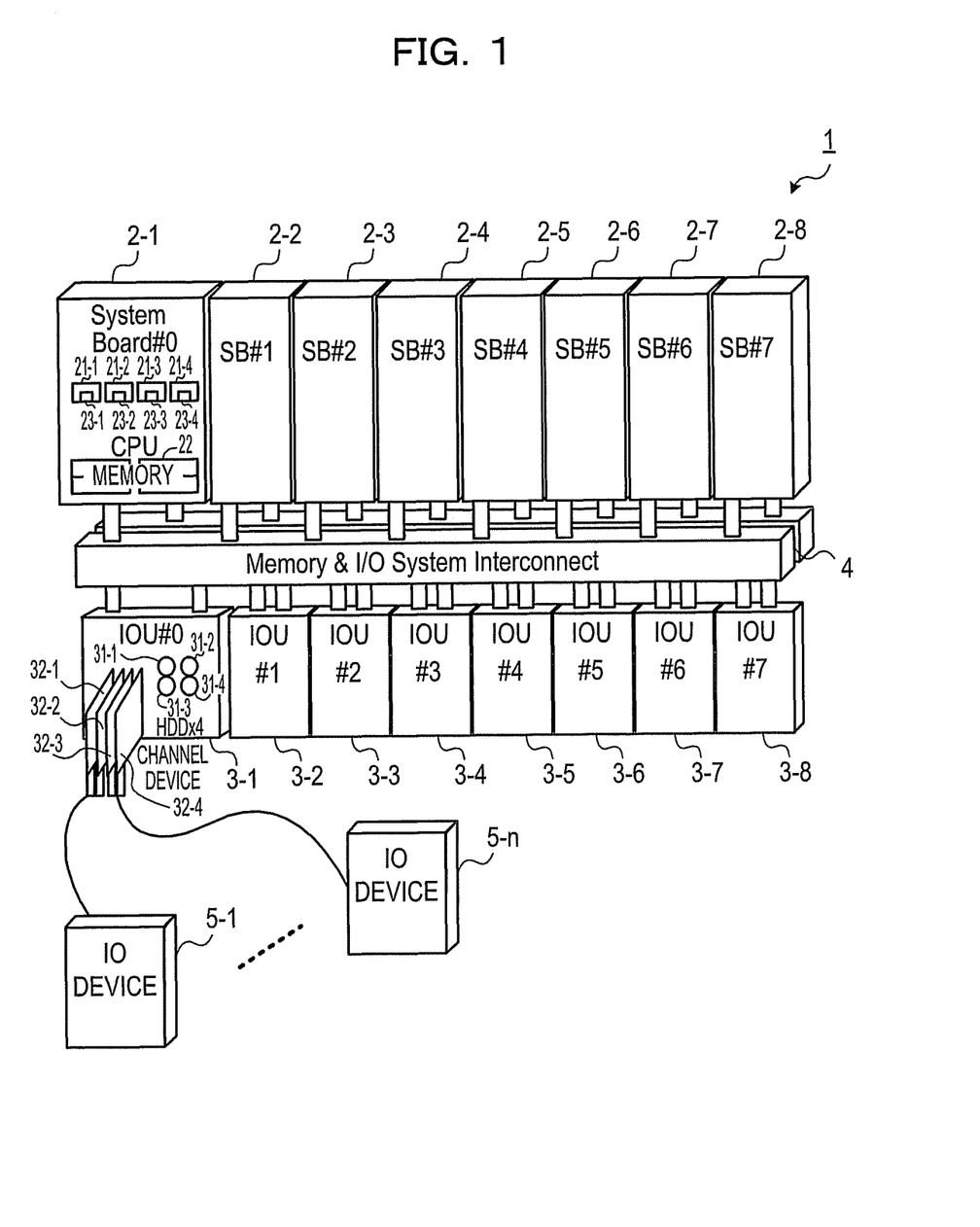
FIG. 1 illustrates a structure of an information processing system according to an embodiment of the present invention.

FIG. 1 illustrates a structure of an information processing system according to an embodiment of the present invention. Information processing system 1 has one or more system boards and one or more IO units connected with the system boards through a system bus, system interconnection bus 4. Information processing system 1 shown in FIG. 1 has eight system boards, 2-1 through 2-8, and the eight IO units, 3-1 through 3-8.

Each system board includes one or more equivalent CPUs and memory 22 that is shared by the CPUs. Each system board shown in FIG. 1 includes four CPUs, 21-1 through 21-4. Each CPU 21-$n$ ($n$ is an integral number greater than 1) controls a connection with each IO unit 3-1 through 3-8. Each CPU has a driver 23-$n$ for configuring a setting value of data list word (DLW) stored in a channel operation buffer (COB) described in detail below. Although the configuration of FIG. 1 is illustrated using multiple CPUs, channel devices, etc., the present invention is not limited to any particular number of components.

Each of IO units 3-1 through 3-8 has a universal bus such as a peripheral component interconnect (PCI) bus that is an internal input-output device of the information processing system 1 and bridged with the system bus 4 internally. The PCI bus is not shown in the accompanying drawings. On the IO units 3-1 through 3-8 are mounted, for example, hard disk drives 31, channel devices 32, a LAN port and an input-output unit such as a CD-ROM drive or a DVD drive though a universal bus.

For example, IO unit 3-1 shown in FIG. 1 has four hard disk drives 31-1 through 31-4 and four channel devices 32-1 through 32-4. IO units 3-2 through 3-8 are not considered to be limited to the structure disclosed above. Each of IO units 3-2 through 3-8 may have only hard disk drive 31 or have the LAN port, or other different structure.

Channel device 32 is a communication card device connecting information processing system 1 and an external IO device 5. The IO devices 5-1 through 5-$n$ are external input-output devices such as hard disk drives, RAID, etc. and are connected with information processing system 1 through channel device 32.

Figure 2:
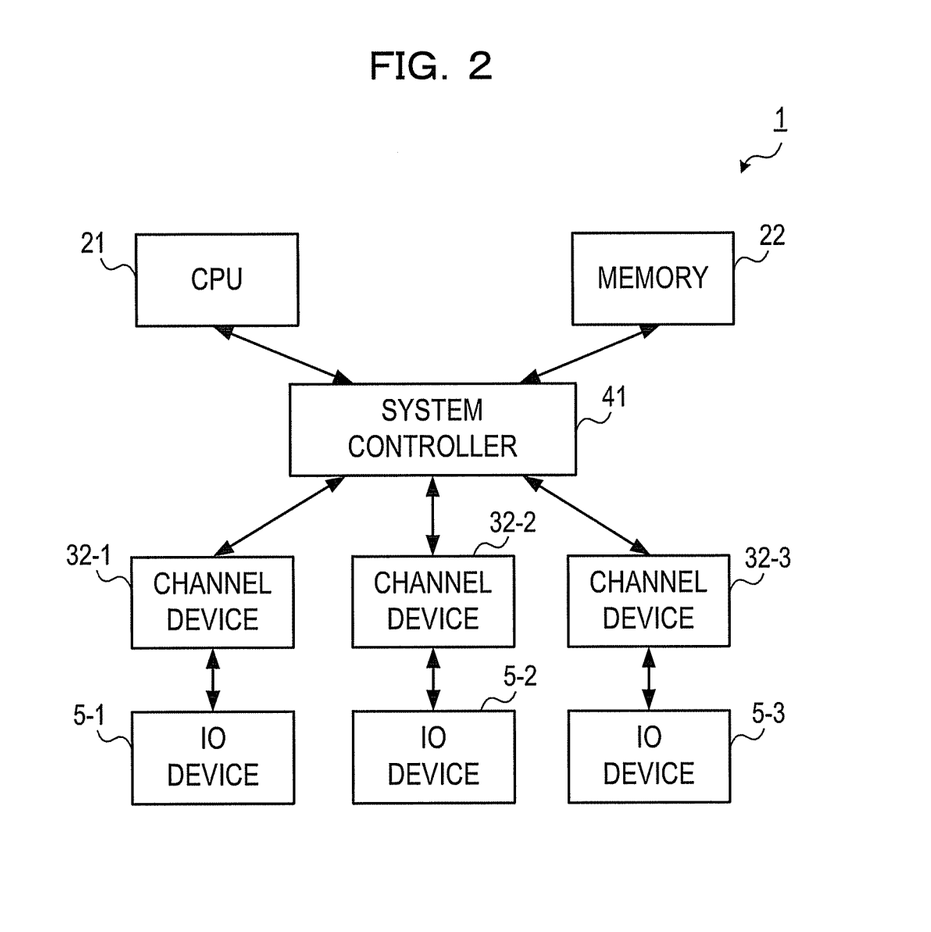
FIG. 2 is a schematic view of an information processing system according to an embodiment of the present invention.

FIG. 2 is a schematic view of information processing system 1 shown in FIG. 1. Information processing system 1 includes a CPU 21, a memory 22, one or more channel devices that are connected with system controller 41 including system bus 4 and the bridge in IO unit 3 shown in FIG. 1. Information processing system shown in FIG. 1 has three channel devices 32-1 through 32-3.

Each of the channel devices 32-1 through 32-3 is connected with one of external IO devices 5-1 through 5-3 respectively.

The embodiment shown in FIG. 2 illustrates the data transfer method of transferring data between memory 22 and IO device 5 through channel device 32 and the structure for implementing the data transfer method.

Figure 3:
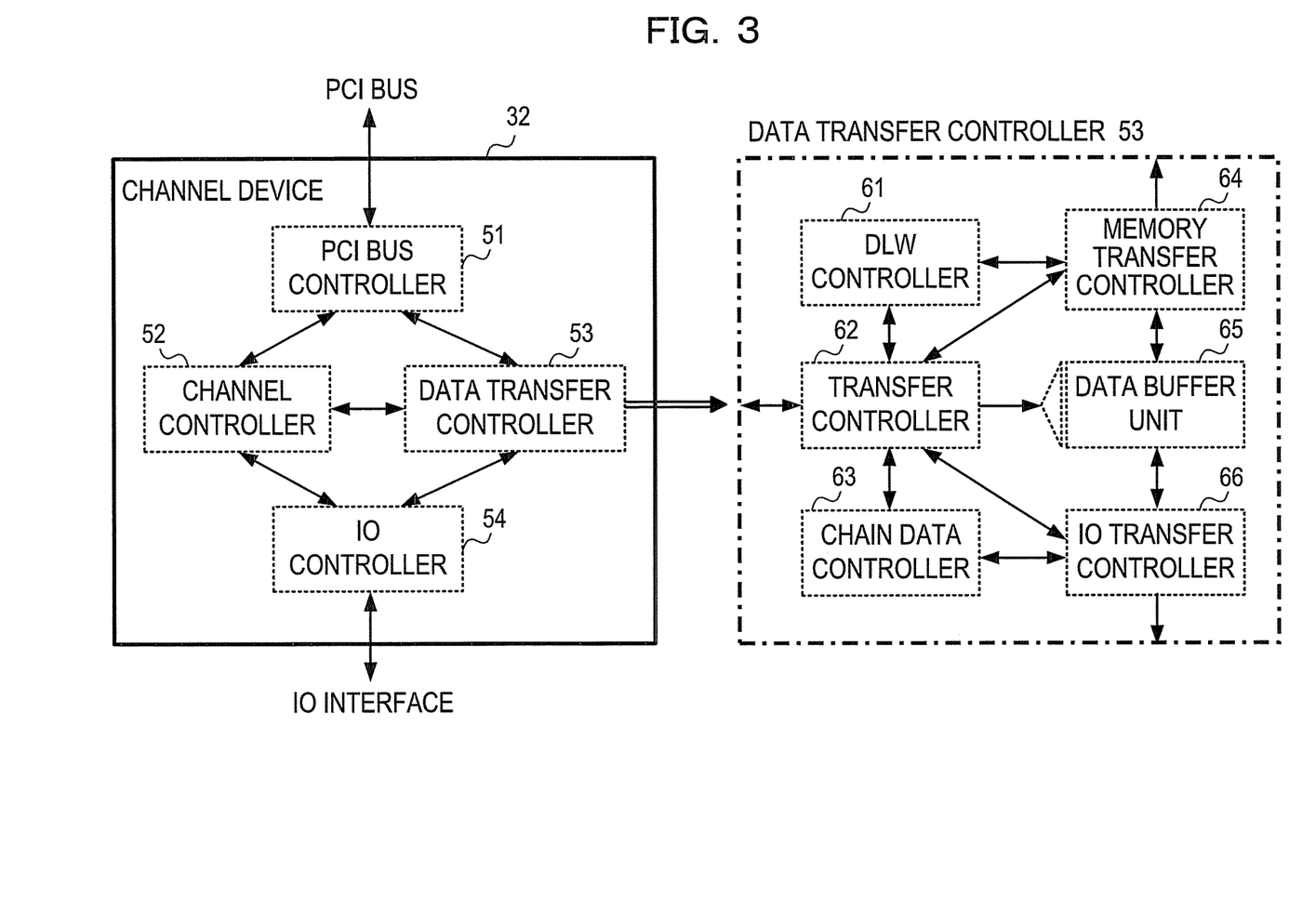
FIG. 3 illustrates an example of a channel device structure according to an embodiment of the present invention.

FIG. 3 illustrates an example of a structure of channel device 32 according to an embodiment of the present invention. Channel device 32 shown in FIG. 3 has a PCI bus controller 51, a channel controller 52, a data transfer controller 53 and an IO controller 54.

PCI bus controller 51 controls a connection with the PCI bus in IO unit 3, which is bridged with the system bus 4. Channel controller 52 controls the entire operation of the channel device 32. Data transfer controller 53 controls data exchange between the memory 22 incorporated in information processing system 1 and IO device 5. IO controller 54 controls a connection with the IO interface incorporated in the IO device 5.

Data transfer controller 53 has a DLW controller 61, a transfer controller 62, a chain data controller 63, a memory transfer controller 64, a data buffer unit 65 and an IO transfer controller 66.

DLW controller 131 controls reading of the DLW stored in memory 22 incorporated in information processing system 1 when processing the chain data. The DLW will be disclosed later. Transfer controller 62 controls the entire operation of the data transfer controller 53. Operation(s) of the chain data controller 63 controls the chain data processing in an embodiment of the present invention. Chain data controller 63 is disclosed below in detail. Memory transfer controller 64 receives the data stored in memory 22 through PCI bus controller 51 and writes the data to data buffer unit 65, or transfers the data stored in data buffer unit 65 to memory 22 through PCI bus controller 51. Data buffer unit 65 is a buffer memory compensating for a difference between the rates of transmissions from memory 22 and from the IO device 5. IO transfer controller 66 transfers the data stored in data buffer unit 65 to IO device 5 through IO controller 54, or writes the data sent from IO device 5 to data buffer unit 65.

Next, the data transfer process used by information processing system 1 according to an embodiment of the present invention in processing chain data is disclosed.

Figure 4:
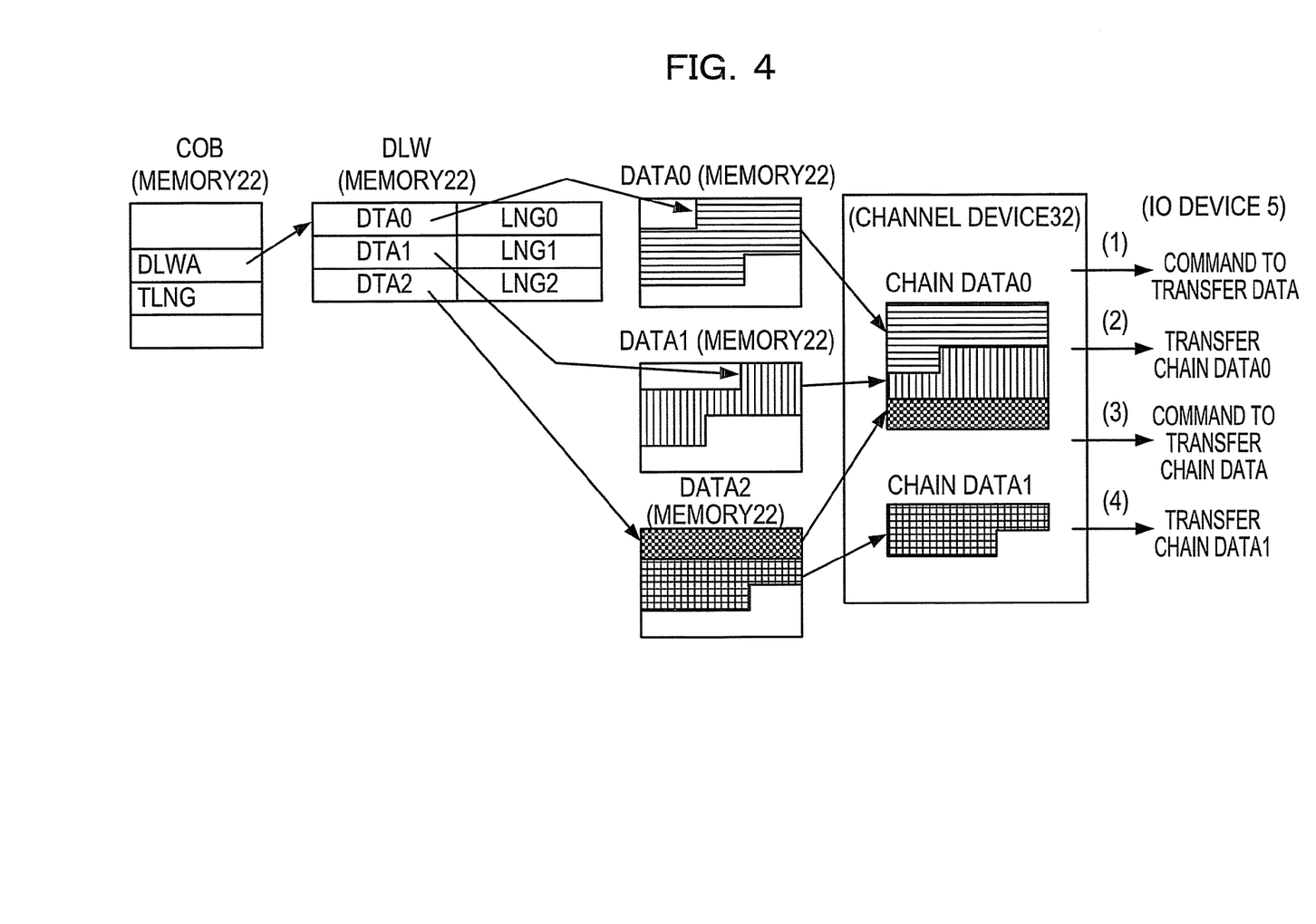
FIG. 4 illustrates transferring of data using the chain data processing according to an embodiment of the present invention.

FIG. 4 illustrates transferring of data by the chain data processing according to an embodiment of the present invention. Driver 23 (FIG. 1) allocates a COB (channel operation buffer) area in memory 22 before starting to transfer data by the chain data processing according to an embodiment of the present invention. The COB area is a buffer memory for storing operation commands issued by the driver 23 to the channel device 32.

Driver 23 provides information for a starting channel device 32 in the COB area. Data list word address (DLWA) listed in an address list, i.e., data list word (DLW), and a total data transfer amount, i.e., a total data lengths (TLNG), are stored in the COB area.

An address list of the DLW is provided in continuous areas in the memory, associating the data transfer start addresses (DTA 0, DTA 1 and DTA 2) of the data distributed to the multiple areas in memory 22 (data 0, data 1 and data 2) with the data length of each data (LNG 0, LNG 1 and LNG 2) and storing the addresses and the data lengths. The DLWA represents the first address of the DLW.

In an embodiment, the chain data processing is executed as follows.

First, the driver 23 issues a command for accessing the IO device 5 to channel device 32. Channel device 32 reads the information from the COB area in memory 22 and executes the chain data processing in accordance with the information stored in the COB area.

DLW controller 61 included in channel device 32 reads DLW in order according to the DLWA of the DLW read from the COB area. Then DLW controller 61 transfers the data between data buffer unit 65 included in channel device 32 shown in FIG. 3 and memory 22 according to data transfer start address, DTA n, and data length, LNG n. When the data transfer according to the one of the DLW are completed, DLW controller 61 reads the next DLW and transfers data between memory 22 and data buffer unit 65 continuously. DLW controller 61 repeats the process disclosed above until the data is transferred according to all the DLWs between memory 22 and data buffer unit 65.

At the same time, chain data controller 63 included in channel device 32 transfers data (chain data 0) between data buffer unit 65 and the IO device 5.

A transmissible data size between data buffer unit 65 and the IO device 5 in the conventional transfer method shown in FIG. 9 is the same transmissible data size between the memory 22 and data buffer unit 65, i.e., 15K bytes. For example, when data 0 are read from the memory and stored in the buffer unit, chain data 0 transferred from the buffer unit to the IO device is the same size as data 0.

In an embodiment, a total amount of data transferred by the chain data processing is represented by a total data length (TLNG). In other words, chain data controller 63 determines a data size transferred between the data buffer unit 65 included in the channel device 32 and the IO device 5 in accordance with a TLNG read from the COB area.

Then the channel device 32: (1) issues a command for transferring the data to IO device to notify the data transfer amount determined by channel device 32; (2) transfers data (chain data 0) to the IO device 5 according to the data length; (3) commands to transfer the chain data to IO device if the data to be transferred remain in data buffer unit 65; (4) transfers the remaining data (chain data 1).

Thus, the data is transferred between memory 22 and the IO device 5 effectively in fewer times. For example, when a data size of data 0, data 1 and data 2 transferred from memory 22 to data buffer unit 65 is the same transmissible data size in the conventional method shown in FIG. 9, 15K bytes, respectively, the data transfer between channel device 32 and the IO device 5 is completed with three transfers. When a TLNG of chain data 0 determined by chain data controller 63 is 32K bytes according to the transfer method shown in FIG. 4, the data transfer is complete with two transfers. Therefore, the data is transferred between memory 22 and the IO device 5 more effectively.

In an embodiment, a data transfer between the memory 22 and the IO device 5 at a time refers to operation(s) executed from when channel device 32 issues a command issued to the IO device 5 to when the data is transferred on the command.

In the example shown in FIG. 4, data 0, data 1 and data 2 are transferred by 15K bytes respectively and the chain data controller 63 determines the total transfer data amount at a time as 32K bytes according to the TLNG read from the COB area. Therefore, the data is transferred between channel device 32 and the IO device 5 with two transfers. When transferring data in a larger data transfer amount, e.g., 64K bytes, data may be transferred in the same amount of chain data 0, i.e., 64K bytes, by combining the chain data command and the data distributed to the multiple areas in the memory after executing the process (2) shown in FIG. 4.

As disclosed above, the chain data transfer between the memory and the channel device or between the channel device and the IO device is controlled independently. In addition, the transmissible data size between the memory and the channel device at a time is different from the data transfer unit between the channel device and the IO device at a time. Therefore, the data is transferred effectively between the memory and the IO device.

When transferring the chain data to the IO device 5, the breakpoint of the chain data transferred to the IO device 5 lastly is needed to be specified clearly.

Figure 5:
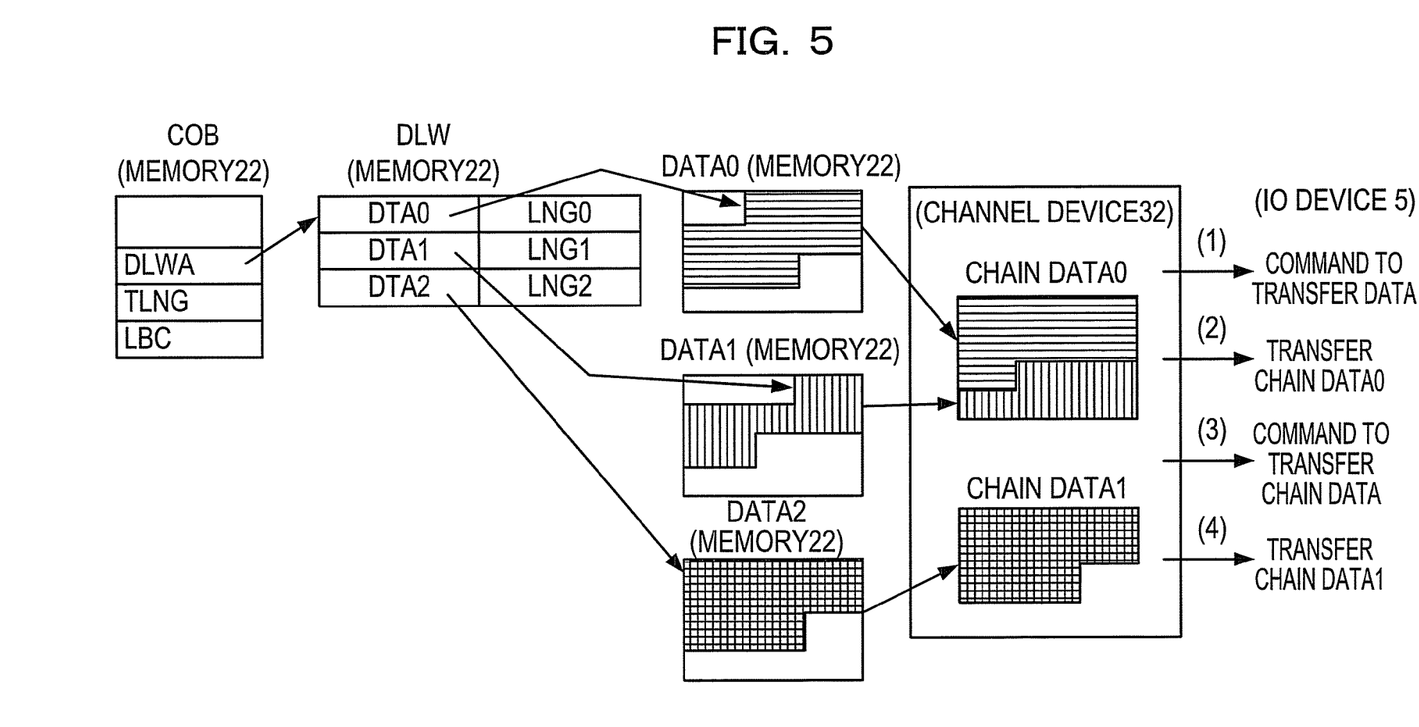
FIG. 5 illustrates transferring of chain data by clarifying a breakpoint of chain data last transferred to the IO device.

FIG. 5 shows clarifying (identifying) a breakpoint of the chain data transferred to the IO device 5 last and transferring the chain data. FIG. 5 shows that operation(s) of a write command, i.e., the data transfer from the memory to the IO device 5. Operations on a read command, i.e., the data transfer from the IO device to the memory, is basically the same as the operations on the write command shown in FIG. 5 except a data is transferred in a reverse direction.

A last byte count (LBC) of the data to be transferred is configured in the COB shown in FIG. 5 in addition to the DLWA of the DLW and the TLNG shown in FIG. 4. The LBC indicates a data length of chain data 2 that are transferred from memory 22 last, LNG 2.

According to the transfer, the chain data controller 63 included in the channel device 32: (1) determines a total data length (TLNG) of data transferred from channel device 32 to the IO device 5 according to the LBC and notifies the TLNG to the IO device; (2) the data is transferred to the IO device 5; (3 and 4) remaining data specified by the LBC are transferred. Therefore, the breakpoint of the chain data is clarified and transferred to the IO device 5.

Figure 6:
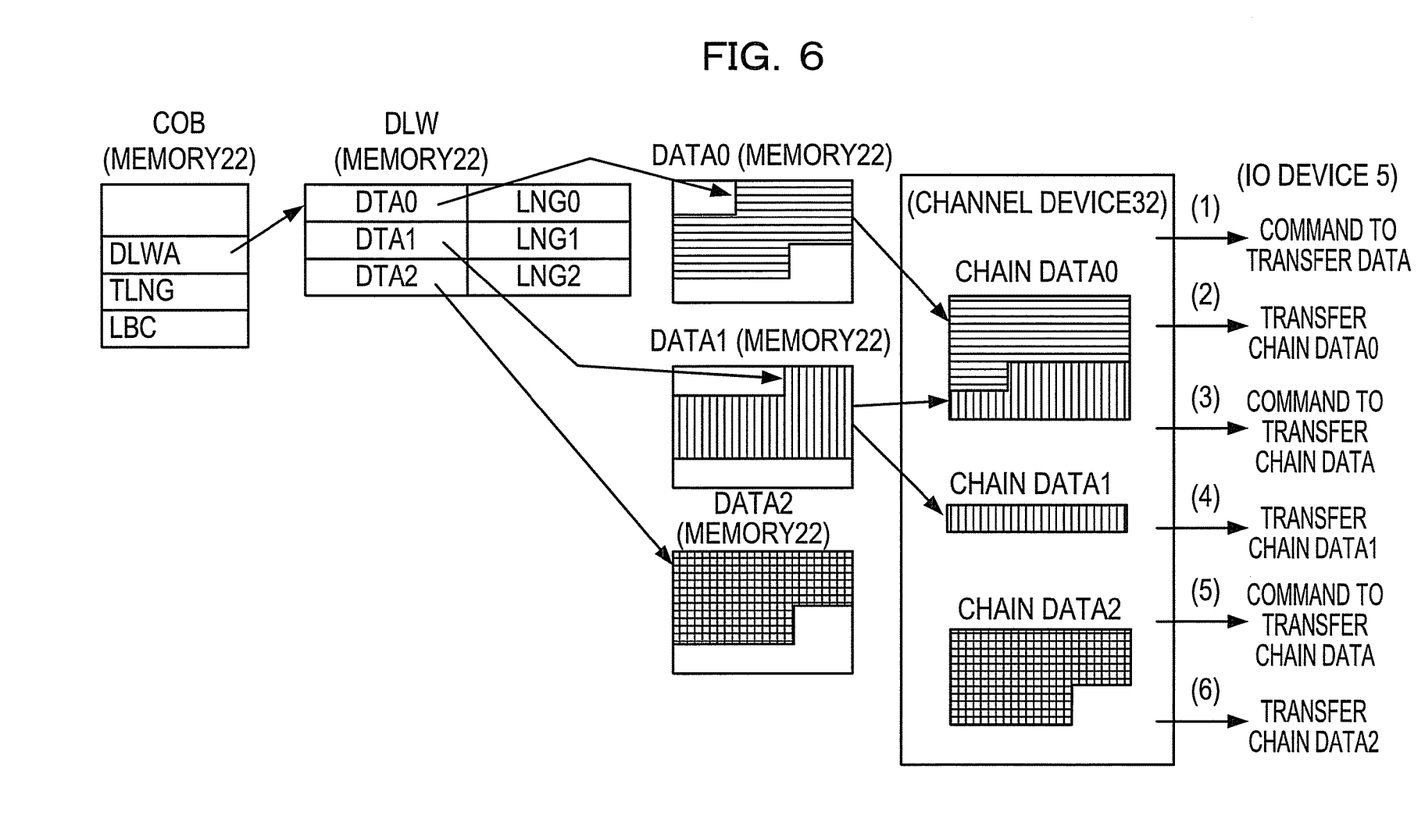
FIG. 6 illustrates a case that data to be transferred to an IO device excluding the chain data to be transferred to IO device last is not transferred at a time.

FIG. 6 shows the case that data to be transferred to the IO device 5 excluding the chain data (the data is shown clearly in FIG. 6) are not transferred at a time. In this case, the data excluding the chain data that are transferred to the IO device 5 lastly are transferred in an order by the data length determined based on a difference between the TLNG and the LBC, e.g., 32K bytes (1, 2) and then the remaining data (chain data 1) are transferred (3, 4). Finally, chain data 2 to be transferred to the IO device 5 last are transferred.

Thus, if the data excluding the chain data to be transferred to the IO device last are not transferred to the IO device 5, the chain data is transferred by clarifying (identifying) a breakpoint of last chain data transferred to the IO device.

Next, chain data controller 63 included in the channel device 32 according to an embodiment, which implements the transfer method disclosed above, will be discloses.

Figure 7:
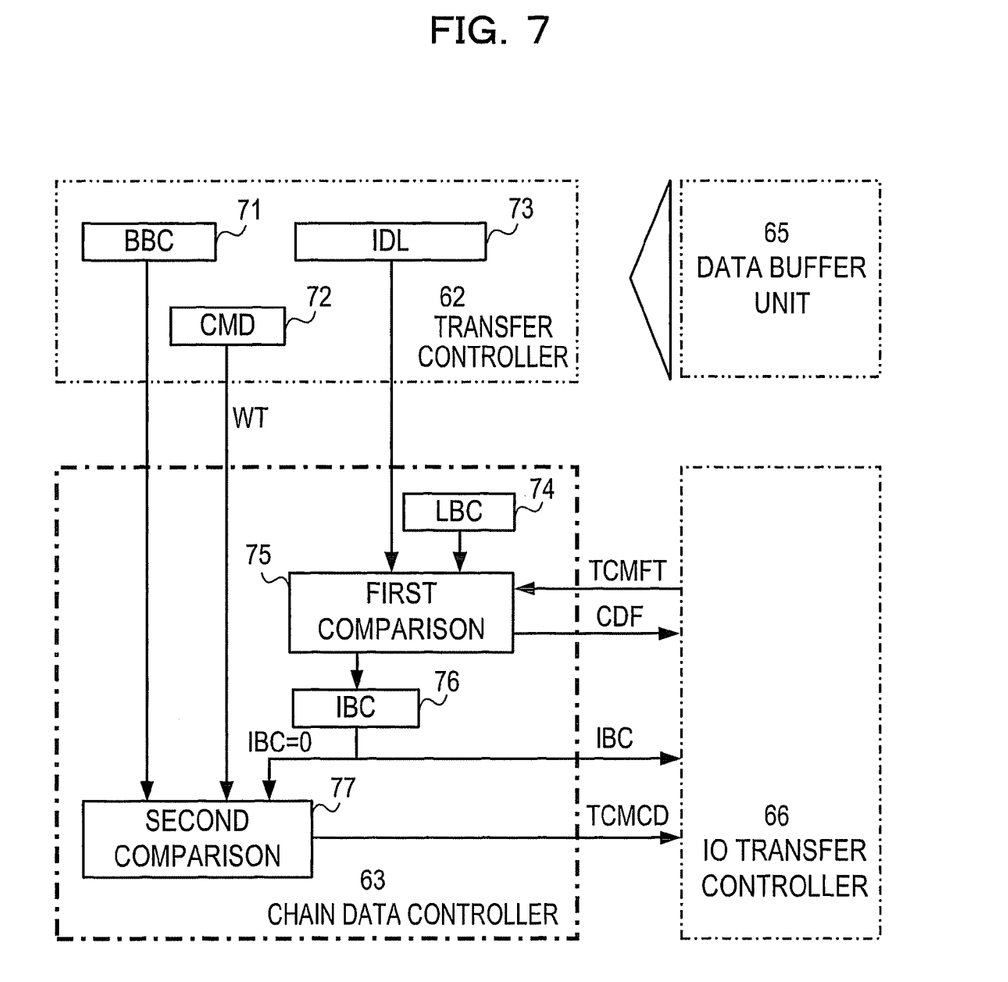
FIG. 7 is a block diagram illustrating a structure of a chain data controller and other data transfer controllers according to an embodiment of the present invention.

FIG. 7 is the block diagram illustrating a structure of a data transfer controller. Transfer controller 62 shown in FIG. 7 has three registers: buffer byte count (BBC) register 71, command (CMD) register 72 and IO data length (IDL) register.

BBC register 71 represents a byte count of valid data stored in data buffer unit 65 in transferring data. A value of BBC register 71 is reset on starting the data transfer. The value of BBC register 71 is notified to chain data controller 63. CMD register 72 is used for storing coded values of commands issued to the IO device 5. The coded command stored in CMD register 72 is notified to chain data controller 63 as a WRITE (WT) command. The WT command is a value representing a transfer direction of data decoded the value stored in CMD register 72. When data is transferred from memory 22 to the IO device 5, the value is "1". When data is transferred from the IO device 5 to memory 22, the value is "0".

IDL register 73 stores a transmissible data size of remaining data to be transferred between the channel device and the IO device. On starting data transfer, a TLNG is configured in IDL resister 73. The value of the TLNG stored in IDL register 73 is decreased when the data is transferred between data buffer unit 65 included in channel device 32 and the IO device 5. The value stored in IDL register 73 is notified to chain data controller 63.

Chain data controller 63 has last byte count (LBC) register 74, comparator 75 (a first comparison), IBC register 76 and comparator 77 (a second comparator).

LBC register 74 is used for configuring a byte count relating to the last chain data, which is notified to the IO device 5 from channel device 32. The value of the LBC configured in the COB is configured in LBC register 74 before a first command is output to the IO device 5. By receiving and processing a command whose chain data flag for specifying an address and byte count of successive data is on, the IO device 5 recognizes that the TLNG will be updated by a next command. IBC (IO byte count) register 76 represents a byte count of the remaining data to be transferred between channel device 32 and the IO device 5. IBC register 76 decreases the byte count when the data is transferred between channel device 32 and the IO device 5. IBC register 76 is used for detecting and end of the chain data transfer between the channel device and the IO device. The value stored in IBC register 76 is notified to IO transfer controller 66.

The comparator 75 (the first comparison) compares a value stored in IDL register 73 and a value stored in LBC register 74 upon a transmission command frame at first (TCMFT) signal is on when a first command is output to the IO device on a command for transferring the data issued by IO transfer controller 66. Based upon a comparison result, comparator 75 configures a value in IBC register 76. The TCMFT signal becomes valid when the first command is output to the IO device 5 on the command for transferring the data. Additionally, comparator 75 (the first comparison) outputs a chain data flag (CDF) signal that becomes valid when a command issued to be transferred to the IO device 5, whose chain data flag is on, is issued to IO transfer controller 66. A size or the length of data to be transferred from data buffer unit 65 included in the channel device 32 to the IO device 5 at a time is determined by setting the value in IBC register 76 by comparator 74 (the first comparison).

Comparator 77 (the second comparison) checks a value stored in BBC register 71 and a WT command obtained by decoding the coded command stored in CMD register 72 where when the value stored in IBC register 76 becomes "0", i.e., the data transfer from the data buffer unit 65 to the IO device 5 completes. When the value stored in BBC register 71 becomes "0", i.e., there are no valid data in data buffer unit 65, or the value of the WT command is 1", i.e., a command issued to the IO device is a write command, comparator 77 (the second comparison) outputs a transmission command frame at chain data (TCMCD) signal to IO transfer controller 66. The TCMCD signal becomes valid when an updated command is output to the IO device 5 on a command for transferring the chain data.

Operation(s) for transferring data by the chain data processing by channel device 32 according to an embodiment will be disclosed.

Figure 8:
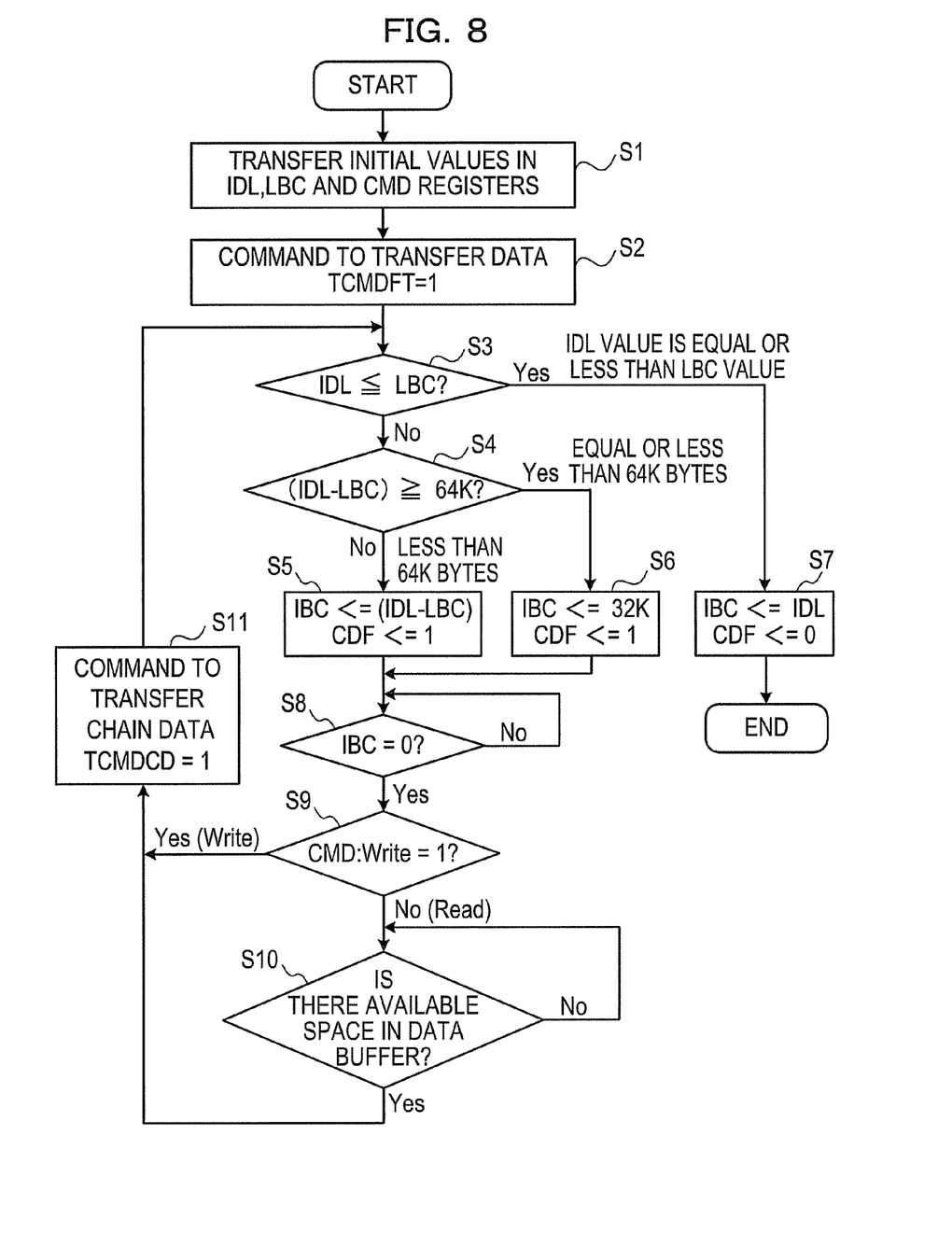
FIG. 8 is a flow chart illustrating an operation executed by a channel device in transferring data.

FIG. 8 is the flow chart illustrating operation(s) executed by a channel device in transferring data. In FIG. 8, at the start of data transfer processing, initial value(s) are set, for example, in BBC register 71, CMD register 72, IDL register 73 and LBC register 74 for the data transfer in operation S1. The value of the TLNG read from the COB is configured in the IDL register included in transfer controller 62. The value coded the command issued to the IO device is configured in CMD register 72. The value stored in BBC register 71 is reset to "0". The byte count relating to the last chain data is configured in LBC register 74 included in chain data controller 63.

In operation S2, channel device 32 commands the IO device 5 to transfer data. IO transfer controller 66 sets the TCMFT signal to chain data controller 63 to "1" when the first command can be output to the IO interface. When the TCMFT signal is set to "1", chain data controller 63 starts to determine a transmissible data size between the channel device and the IO device.

To determine the transmissible data size, chain data controller 63 included in channel device 32 compares the value stored in IDL register 73 with the value stored in LBC register 74 in operation S3. If the value stored in IDL register 73 is greater than the value stored in LBC register (operation S3, No), chain data controller 63 judges whether a value derived by subtracting the value stored in LBC register 74 from the value stored in IDL register 73 is greater than 64K bytes. When the value is greater than 64K bytes (operation S4, Yes), the value stored in IBC register 76 is set to 32K bytes and the CDF signal is set to "1" in operation S6. Then the process moves on to operation S8. For example, a maximum transmissible data size is 64K bytes in an embodiment. If a size of the remaining data is equal or greater than 64K bytes, the remaining data is transferred in a size of 32K bytes. The value of the transmissible data size is not considered to be limited to 32K bytes. Any value(s) equal to or less than 64K bytes may be processed accordingly.

When the value derived by subtracting the value stored in LBC register 74 from the value stored in IDL register 73 is less than 64K bytes (operation S4, No), the value stored in IBC register 76 is configured to the derived by subtracting the value stored in the LBC register 74 from the value stored in IDL register 73 and the CDF signal is configured to "1" in operation S5. Then the process moves on to operation S8.

When the value stored in IDL register 73 is equal to or less than the value stored in LBC register 74 in operation S3 (Yes), the value stored in IBC register 76 is configured to the value stored in IDL register 73 and the CDF signal is configured to "0" in operation S7 and complete the process.

The transmissible data size between channel device 32 and the IO device 5 at a time is determined by setting value(s) stored in IBC register 76 in the processes in operations S3 through S7 and the value of the chain data flag is determined according to the CDF signal. Thus, the data transfer between the channel device 32 and the IO device 5 starts and the value stored in the IBC register is decreased according to the transmissible data size. IBC register 76 represents the byte count of the remaining data to be transferred between the channel device 32 and the IO device 5. After determining the value stored in IBC register 76 and the value of the CDF signal in operations S5 and S6, chain data controller 63 checks the value stored in IBC register 76 and waits until the value becomes "0" (operation S8, No).

When the value stored in IBC register 76 becomes "0" (operation S8, Yes), chain data controller 63 checks the WR value obtained from CMD register 72 to confirm whether the output command is a read command or a write command in operation S9. When the command is the read command (operation S9, No), chain data controller 63 checks whether data buffer unit 65 has sufficient available space and waits until the sufficient space is freed (operation S10, No). If there is the available space in the data buffer unit, the process moves on to operation S11.

If the command is a write command (operation S9, Yes), there are no data to be transferred to the IO device 5 on the write command, thus there is no need to confirm whether there is the available space in data buffer unit 65. Operation S10 is skipped and the process moves on to operation S11.

In operation S11, chain data controller 63 configures the TCMCD signal to IO transfer controller 66 to "1", i.e., configures the TCMDC "on". Then the process goes back to operation S3, and a size of data to be transferred between the channel device 32 and the IO device 5 and a value of the CDF signal are determined on the updated command. Operations S3 through S10 are repeated until all the data are transferred and the value of the CDF signal is configured to "0".

When the value derived by subtracting the LBC from the first configured TLNG is equal to or greater than 64K bytes, the data are divided by 32K bytes and transferred to the IO device 5 by channel device 32 in the chain data processing shown in FIG. 8.

When the transmissible data size of the remaining data derived by subtracting the LBC from the IDL becomes less than 64K bytes, the data less than 64K bytes are transferred to the IO device 5 in a lump. When the data transfer is completed, the LBC of the chain data are transferred last.

According to an embodiment of the present invention, the data distributed to the multiple areas in the memory are transferred to the IO device in a specific data length configured by channel device 32. Therefore, the latency time for the IO interface is decreased and the transmission performance is improved.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A channel device connecting an input-output device with an information processing device that includes a storage device and an information processor, and enabling transfer of continuous data including plural data distributed into multiple areas in the storage device between the information processing device and the input-output device, the channel device comprising:
   a data buffer unit that stores data to be transferred between the storage device and the input-output device, the storage device storing an address list having plural transfer information each corresponding to one of data included in the continuous data, and channel startup information including data list word address information indicating an address from among addresses of the address list, total data transfer amount information indicating a data length of the continuous data to be transferred, and last data byte count information of last data to be transferred;
   a storage device transfer controller that transfers each of data included in the continuous data between the storage device and the data buffer unit based on the data list word address information included in the channel startup information and the transfer information included in the address list;
   a chain data controller that sets an amount of data to be transferred based on the total data transfer amount information read from the channel startup information stored in a channel operation buffer; and
   an input-output device transfer controller transferring the continuous data between the data buffer unit and the input-output device in the amount of data set by the chain data controller based on a value representing byte count of remaining continuous data to be transferred and the data list word address information indicating data transfer start addresses with data length of data included in the continuous data, and
   wherein the input-output device transfer controller divides data excluding the last data from the continuous data by a specific data transfer amount determined using the transfer information and the last data byte count information and transfers the divided data between the data buffer unit and the input-output device by the specific data transfer amount,
   wherein the input-output device transfer controller transfers the last data between the data buffer unit and the input-output device after transferring the continuous data excluding the last data by the specific data transfer amount, and
   wherein an information processor has a driver to command a processor to store the address list, the channel startup information and the last data byte count information in the storage device.

2. The channel device according to claim 1,
   wherein the transfer information includes transfer start address information and transfer amount information of the one of the data included in the continuous data, and
   wherein the transfer information includes transfer start address information and transfer amount information of subsequent data.

3. The channel device according to claim 1, wherein the input-output transfer controller transfers the continuous data between the data buffer unit and the input-output device by data unit that is different from a unit of the data transferred between the storage device and the buffer unit.

4. A system having an information processor with a processor and a storage device, an input-output device connected with the information processor and a channel device transferring continuous data including plural data distributed into multiple areas in the storage device between the information processor and the input-output device, the system comprising:
   the storage device including:
      an address list including plural transfer information of each corresponding to one of data included in the continuous data;
      data list word address information indicating an address from among addresses of the address list and total data transfer amount information indicating a data length of the continuous data to be transferred, and
      last data byte count information of last data to be transferred, the channel device including:
- a data buffer unit configured to store data to be transferred between the storage device and the input-output device;
- a storage device transfer controller that transfers each of data included in the continuous data between the storage device and the data buffer unit based on the data list word address information included in the channel startup information and the transfer information included in the address list;
- a chain data controller that sets an amount of data to be transferred based on the total data transfer amount information read from the channel startup information stored in a channel operation buffer, and
- an input-output device transfer controller transferring the continuous data between the data buffer unit and the input-output device in the amount of data set by the chain data controller based on a value representing byte count of remaining continuous data to be transferred and the data list word address information indicating data transfer start addresses with data length of data included in the continuous data, and
- wherein the transfer information includes transfer start address information and the transfer amount information of the one of the data included in the continuous data,
- wherein the transfer information includes the transfer start address information and the transfer amount information of subsequent data,
- wherein the storage device divides the continuous data excluding the last data by a specific data transfer amount determined using the transfer information and the last data byte count information, and transfers the divided data by the specific data transfer amount between the data buffer unit and the input-output device,
- wherein the input-output device transfer controller transfers the last data between the data buffer unit and the input-output device after dividing and transferring the continuous data excluding the last data; and
- wherein the information processor comprises a driver to command the processor to store the address list, the channel startup information and the last data byte count information in the storage device.

5. A data transfer method of a channel device connecting an input-output device to an information processor having a processor and a storage device, and transferring continuous data including plural data distributed into multiple areas in the storage device data between the information processor and the input-output device, the channel device including a data buffer unit, the data transfer method comprising:
- storing, in the storage device, an address list including plural transfer information each corresponding to one of data included in the continuous data;
- storing, in the storage device, channel startup information including a data list word address indicating an address from among addresses of the address list, total data transfer amount information indicating a data length of the continuous data to be transferred, and last data byte count information of last data to be transferred;
- storing, in the data buffer unit, data transferred between the storage device and the input-output device;
- transferring each of data included in the continuous data between the storage device and the data buffer unit based on the data list word address information included in the channel startup information and the transfer information stored in the address list;
- setting an amount of data to be transferred based on the total data transfer amount information read from the channel startup information stored in a channel operation buffer, and
- transferring the continuous data between the data buffer unit and the input-output device in the amount of data set by the chain data controller based on a value representing byte count of remaining continuous data to be transferred and the data list word address information indicating data transfer start addresses with data length of data included in the continuous data,
- wherein the input-output device transfer controller divides the continuous data excluding the last data by the specific data transfer amount determined using the transfer information and the last data byte count information, and transfers the divided data by the specific data transfer amount between the data buffer unit and the input-output device
- wherein the input-output device transfer controller transfers the last data between the data buffer unit and the input-output device after transferring the divided continuous data excluding the last data.

6. The data transfer method according to claim 5, wherein the transfer information includes transfer start address information and transfer amount information of the one of the remaining data included in the continuous data.

* * * * *

UNITED STATES PATENT AND TRADEMARK OFFICE
CERTIFICATE OF CORRECTION

| | |
|---|---|
| PATENT NO. | : 8,769,167 B2 |
| APPLICATION NO. | : 12/369445 |
| DATED | : July 1, 2014 |
| INVENTOR(S) | : Shuji Nishino |

It is certified that error appears in the above-identified patent and that said Letters Patent is hereby corrected as shown below:

In the Claims

Column 12, Line 45, In Claim 6, After "information of" delete "the one of the".

Signed and Sealed this
Fourth Day of November, 2014

Michelle K. Lee
*Deputy Director of the United States Patent and Trademark Office*